United States Patent
Blanchon et al.

(10) Patent No.: US 11,195,420 B2
(45) Date of Patent: Dec. 7, 2021

(54) METHOD AND SYSTEM FOR ASSISTING IN THE FLIGHT MANAGEMENT OF AN AIRCRAFT IN TERMS OF OPTIMIZING THE OPERATING COSTS OF SAID AIRCRAFT

(71) Applicant: THALES, Courbevoie (FR)

(72) Inventors: Xavier Blanchon, Toulouse (FR); Guillaume Boyer, Toulouse (FR); Guillaume Meulle, Toulouse (FR); Sonia Vautier, Toulouse (FR)

(73) Assignee: THALES, Courbevoie (FR)

( * ) Notice: Subject to any disclaimer, the term of this patent is extended or adjusted under 35 U.S.C. 154(b) by 277 days.

(21) Appl. No.: 16/003,649

(22) Filed: Jun. 8, 2018

(65) Prior Publication Data

US 2018/0366011 A1 Dec. 20, 2018

(30) Foreign Application Priority Data

Jun. 16, 2017 (FR) ...................................... 1700648

(51) Int. Cl.
*G08G 5/00* (2006.01)
*G01C 21/20* (2006.01)
(Continued)

(52) U.S. Cl.
CPC ........... *G08G 5/0039* (2013.01); *G01C 21/20* (2013.01); *G01C 23/00* (2013.01); *G05D 1/0005* (2013.01);
(Continued)

(58) Field of Classification Search
CPC .. G08G 5/0039; G08G 5/0091; G08G 5/0056; G08G 5/0026; G08G 5/0021;
(Continued)

(56) References Cited

U.S. PATENT DOCUMENTS 9,290,262 B2 3/2016 Laso-Leon et al.
2013/0226452 A1 8/2013 Watts
(Continued)

FOREIGN PATENT DOCUMENTS

FR 3 002 657 A1 8/2014
FR 3 022 625 A1 12/2015
FR 3 032 271 A1 8/2016

OTHER PUBLICATIONS

Folse et al., Cruise Altitude and Speed Optimization Implemented in a Pilot Decision Support Tool, Jun. 2016, American Institute of Aeronautics and Astronautics (AIAA), 16th AIAA Aviation Technology, Integration, and Operations Conference (Year: 2016).*

(Continued)

*Primary Examiner* — Nadeem Odeh
(74) *Attorney, Agent, or Firm* — BakerHostetler (57) ABSTRACT

A method for assisting in a flight management of an aircraft calculates a local cost function CF(xi, hj) at various altitudes hj along a planned vertical reference flight trajectory over a discrete set of points P(xi, hj) which forms a two-dimensional grid in which the planned vertical reference flight trajectory varies, the local cost function CF(xi, hj) being calculated locally at each point P(xi, hj) according to aircraft data and environmental data predicted at said local point P(xi, hj). Then, for each point P(xi, hj) of the grid, the method determines a neighbourhood including the point P(xi, hj), and associates a colour K(xi, hj) therewith that is dependent on the value of the local cost function CF(xi, hj) using a predetermined bijective lookup transformation. Next, the method displays the coloured grid formed by the coloured neighbourhoods.

13 Claims, 5 Drawing Sheets

(51) Int. Cl.
  *G05D 1/06* (2006.01)
  *G05D 1/00* (2006.01)
  *G01C 23/00* (2006.01)
  *G05D 1/10* (2006.01)

(52) U.S. Cl.
  CPC ......... *G05D 1/0607* (2013.01); *G05D 1/1062* (2019.05); *G08G 5/0013* (2013.01); *G08G 5/0021* (2013.01); *G08G 5/0026* (2013.01); *G08G 5/0047* (2013.01); *G08G 5/0056* (2013.01); *G08G 5/0091* (2013.01)

(58) Field of Classification Search
  CPC .. G08G 5/0047; G08G 5/0013; G05D 1/0607; G05D 1/0005; G05D 1/1062; G01C 23/00; G01C 21/20
  USPC .......................................................... 701/120
  See application file for complete search history.

(56) References Cited

U.S. PATENT DOCUMENTS

2016/0225265 A1* 8/2016 Pierre .................. G08G 5/0021
2018/0240347 A1* 8/2018 Shamasundar ...... G08G 5/0026

OTHER PUBLICATIONS

Heatmap, The Data Visualisation Catalogue—Heatmap (Matrix), Jan. 2017, The Data Visualisation Catalogue Online Website < https://datavizcatalogue.com/methods/heatmap.html> (Year: 2017).*

* cited by examiner

METHOD AND SYSTEM FOR ASSISTING IN THE FLIGHT MANAGEMENT OF AN AIRCRAFT IN TERMS OF OPTIMIZING THE OPERATING COSTS OF SAID AIRCRAFT

CROSS-REFERENCE TO RELATED APPLICATIONS

This application claims priority to foreign French patent application No. FR 1700648, filed on Jun. 16, 2017, the disclosure of which is incorporated by reference in its entirety.

FIELD OF THE INVENTION

The present invention relates to a method and to a system for assisting in the flight management of an aircraft in terms of optimizing the operating costs of said aircraft.

The present invention relates in particular to a display for assisting the flight crew of an aircraft in making decisions relating to the flight management of the aircraft with respect to the forecast operating costs.

The field of the invention is that of flight management in an onboard avionics system such as a flight management system FMS and/or a "non-avionics" or "open" management system such as electronic flight bags or other tablets or computers, whether on board the aircraft or located on the ground, and more specifically that of human-machine interfacing with these computers.

BACKGROUND

Avionics systems, such as flight management systems FMS, are already capable of calculating predictions of the position and of the consumption of an aircraft. Other onboard systems, such as the EFB, are capable of similar calculations with greater capacity and fewer security and certifiability restrictions, albeit not quite as reliably.

The work of the flight crew of an aircraft requires enlightened decisions to be made on the fuel management strategy so as to meet safety demands, which take the form for example of observing statutory fuel margins, as well as to decrease the cost of the flight and pollutant emissions.

In general, it is sought to assist the crew of an aircraft in making decisions relating to the choice of a vertical trajectory allowing the flight operating costs of the aircraft to be optimized.

Nowadays, when cruising, on-board systems such as the flight management system FMS have functions which allow a form of optimization in terms of decreasing the flight cost and pollutant emissions in keeping with statutory margins. These functions relate to determining an optimal flight Mach, which depends on the aircraft state and on the cost index entered by the crew, and to calculating an optimal altitude.

The limitations of the functions that are currently used mainly reside in the fact that they are optimizations of local scope. Thus, at a given time, these functions consist both in presenting the crew with the altitude at which the aircraft should fly to minimize the cost of its flight and in keeping the aircraft at the optimal cruising speed.

However, these current functions do not account for the fact that the calculating conditions leading to this result, in particular the meteorological conditions, are changeable and will vary over the course of the flight due to the variation with time of the parameters relating to these conditions and also because of the movement of the aircraft. Once the decision has been made, it is therefore necessary to fly for a minimum time under the conditions that make the new altitude optimal to absorb the overconsumption required for the climb. For example, if the current flight level is "FL310" and if the flight management system indicates that the optimal flight level is "FL340", the pilot has no information on the length of time for which this information is valid. If the crew decides to follow this indication but encounters, ten minutes later, adverse conditions which are ultimately disadvantageous, there would have been an overconsumption of fuel during the climb of the aircraft for nothing. Making the decision to follow or not to follow this indication is therefore, according to the current state of the art, a gamble on the result of the trade-off between the expected benefit from flying at the indicated optimal altitude and the overconsumption of fuel required to climb to this altitude.

Additionally, although known methods currently exist, such as for example that described in U.S. Pat. No. 9,290,262 B2, which make it possible to calculate a lower cost trajectory in a forecast meteorological environment, they were designed to be used in the flight planning phase. The problem with these methods mainly resides in the fact that contingencies which were unforeseen in this planning phase, such as for example closed airspaces or interfering traffic, may suddenly occur and prevent the aircraft from flying the planned optimal trajectory.

SUMMARY OF THE INVENTION

The technical problem is that of decreasing the risk of the gamble, made by the crew when the decision is made to change the flight level with a view to optimizing the flight operating cost of the aircraft, being lost or else that of increasing the relevance and interest of such a decision with respect to the vagaries that are inherent to a sudden change in meteorological conditions or other environmental conditions.

The technical problem is therefore that of providing a method and a system for assisting in the flight management of an aircraft that improve the relevance of the decisions made to optimize the flight operating costs of the aircraft, in particular the fuel consumption thereof.

To this end, one subject of the invention is a method for assisting in the flight management of an aircraft, implemented by an onboard or ground-based flight management assist system. The flight management assist method comprises a first step of calculating and delivering a planned vertical reference trajectory on the basis of a flight plan entered beforehand and validated by the crew. The flight management assist method is characterized in that it comprises steps consisting in:

in a second step, calculating a local cost function $CF(x_i, h_j)$, representing a predetermined flight operating cost, at various altitudes $h_j$ along the planned reference flight trajectory over a discrete set of points $P(x_i, h_j)$, defined by an abscissa $x_i$ and an ordinate $h_j$, respectively, and parameterized by a first integer abscissa index i and a second integer index j, respectively, so as to form the nodes of a two-dimensional grid of a frame of reference in which the planned vertical reference flight trajectory varies, the calculation being performed locally at each point $P(x_i, h_j)$ according to aircraft data and environmental data predicted at said point $P(x_i, h_j)$; and in a third step, determining, for each point $P(x_i, h_j)$, a compact neighbourhood of predetermined shape including said point $P(x_i, h_j)$, and associating, with said point $P(x_i, h_j)$, a colour $K(x_i, h_j)$ that is dependent on the value of the cost function using a predetermined bijective lookup transformation T or table.

According to particular embodiments, the method for assisting in the flight management of the aircraft includes one or more of the following features:

the flight management assist method further comprises a fourth step, consecutive to the third step, consisting in displaying, by means of a vertical trajectory display, a coloured map $K(x_i, h_j)$ formed by the coloured neighbourhoods of all of the points $P(x_i, h_j)$ of the two-dimensional grid;

the colour representing a "neutral" cost, which does not necessitate a modification of the vertical trajectory, corresponds to the currently calculated cost on the planned reference trajectory, or the colour representing a "neutral" cost, which does not necessitate a modification of trajectory, corresponds to a mean cost $(C_{max}+C_{min})/2$ over the range of variation in the operating cost defined by a first, minimum cost value $C_{min}$ and a second, maximum cost value $C_{max}$;

for each point $P(x_i, h_j)$, the second step successively carries out: a first sub-step in which an optimum flight Mach Mopt is calculated on the basis of the predicted trajectory in terms of position, speed and mass of the aircraft, predicted temperature and wind information and a database of aircraft performance; a second sub-step in which, on the basis of the calculated optimum Mach Mopt and the predicted wind at $P(x_i, h_j)$, a ground speed $GS(x_i, h_j)$ of the aircraft and an instantaneous fuel consumption $FF(x_i, h_j)$ are calculated; and a third sub-step in which the cost function at $P(x_i, h_j)$ is an operating cost $CF(x_i, h_j)$ which is dependent on the ground speed $GS(x_i, h_j)$ of the aircraft and on the instantaneous fuel consumption $FF(x_i,h_j)$ at the point $P(x_i, h_j)$ of the grid;

at each point $P(x_i, h_j)$, the local operating cost $CF(x_i, h_j)$ is calculated according to a first expression $CF(x_i, h_j)=(FF(x_i, h_j)+CI*60)/GS(x_i, h_j)$, in which CI denotes a cost index, or a second expression $CF(x_i, h_j)=FF(x_i, h_j)/GS(x_i, h_j)$;

the expression for calculating the local operating cost $CF(x_i, h_j)$ can be selected from either of the first expression and the second expression;

the method for assisting in the flight management of an aircraft further comprises: a fifth step of calculating the positions and the amplitude of a whole number NP of stages which optimizes the operating cost of the flight; a sixth step, consecutive to the fifth step (26), of creating an optimal trajectory in the predicted environment using the calculated positions and amplitudes of the NP stages; and a seventh step, consecutive to the sixth step, of displaying the optimal trajectory in the predicted environment as a superimposition on the coloured map so as to clearly distinguish it from the planned reference trajectory;

the method for assisting in the flight management of an aircraft further comprises an eighth step, consecutive to the seventh step, of updating and re-displaying the optimal trajectory in the predicted environment when trajectory update conditions are met;

the trajectory update conditions are an update of the weather conditions; a change in a cost index; and/or a modification of the lateral or vertical flight plan in the form of a modification of the route or an insertion of an altitude, speed or time restriction, or a modification of the cruising altitude, of accounting for a locally measured wind that differs significantly from the predicted wind.

Another subject of the invention is a system for assisting in the flight management of an aircraft, comprising:

one or more electronic processing computers;

data entry means to allow a crew to enter data into the one or more computers;

at least one display for displaying one or more vertical flight trajectories; and a meteorological database;

the one or more electronic processing computers and one of the at least one display being configured, in a first step, to deliver a planned vertical reference flight trajectory on the basis of a flight plan entered beforehand and validated by the crew.

The flight management assist system is characterized in that the one or more electronic processing computers are configured:

in a second step, to calculate a local cost function $CF(x_i, h_j)$, representing a predetermined flight operating cost, at various altitudes $h_j$ along the planned reference flight trajectory over a discrete set of points $P(x_i, h_j)$, defined by an abscissa $x_i$ and an ordinate $h_j$, respectively, and parameterized by a first integer abscissa index i and a second integer index j, respectively, so as to form a two-dimensional grid in which the planned reference vertical flight trajectory varies, the cost function $CF(x_i, h_j)$ being calculated locally at each point $P(x_i, h_j)$ according to aircraft data and environmental data predicted at said point $P(x_i, h_j)$; and in a third step, to determine, for each point $P(x_i, h_j)$, a compact neighbourhood of predetermined shape including said point $P(x_i, h_j)$, and associating, with said point $P(x_i, h_j)$, a colour $K(x_i, h_j)$ that is dependent on the value of the local cost function using a predetermined bijective lookup transformation T or table.

According to particular embodiments, the flight management assist system includes one or more of the following features:

at least one vertical trajectory display is configured, in a fourth step consecutive to the third step, to display a coloured map $K(x_i, h_j)$ formed by the coloured neighbourhoods of all of the points $P(x_i, h_j)$ of the two-dimensional grid;

the colour representing a "neutral" cost, which does not necessitate a modification of the vertical trajectory, corresponds to the currently calculated cost on the planned reference trajectory, or the colour representing a "neutral" cost, which does not necessitate a modification of trajectory, corresponds to a mean cost $(C_{max}+C_{min})/2$ over the range of variation in the cost defined by a first, minimum cost value $C_{min}$ and a second, maximum cost value $C_{max}$;

the one or more electronic processing computers are configured, in the second step and for each point $(x_i, h_j)$, to successively carry out: a first sub-step in which an optimum flight Mach Mopt is calculated on the basis of the predicted trajectory in terms of position, speed and mass of the aircraft, predicted temperature and wind information and a database of aircraft performance; a second sub-step in which, on the basis of the calculated optimum Mach Mopt and the predicted wind at $(x_i, h_j)$, the ground speed GS of the aircraft and the instantaneous fuel consumption FF are calculated; and a third sub-step in which the cost function at $P(x_i, h_j)$ is a local operating cost which is dependent on the ground speed $GS(x_i, h_j)$ of the aircraft and on the instantaneous fuel consumption $FF(x_i,h_j)$ at the point $P(x_i, h_j)$ of the grid;

the one or more electronic processing computers are comprised in the set of computers of an onboard avionics system and an open "non-avionics" management system, and/or the one or more electronic processing computers are comprised in the set of computers of a flight management system FMS, and of the onboard EFBs and of the computers of a ground tool of an operator, which computers are interfaced with the flight management system FMS;

the one or more electronic processing computers is a single processing computer having a high security level configured to calculate the planned reference trajectory, the cost grid, and an optimal trajectory in the predicted environment, and one and the same display is configured to display, at the same time, the planned reference trajectory, the cost grid, and the optimal trajectory in the predicted environment; or the one or more electronic processing computer includes a first processing computer having a high security level, configured to calculate the planned reference trajectory, and a second processing computer having a security level that is lower than that of the first processing computer, configured to calculate the cost grid, and an optimal trajectory in the predicted environment; a first display is configured to display the planned reference trajectory and a second display is configured to display the cost grid, the planned reference trajectory and the optimal trajectory in the predicted environment;

the meteorological database is on board the aircraft, or located on the ground while being physically embedded in or connected to a ground station that is remote from the aircraft, the ground station being connected to the processing computer(s) via a telecommunications link.

Another subject of the invention is a display for assisting in the flight management of an aircraft comprising a display screen configured to display a coloured map K(xi, hj) formed by coloured neighbourhoods of a discrete set of points P(xi, hj) of a two-dimensional grid in which a planned vertical reference flight trajectory varies. The points P(xi, hj) are defined by an abscissa xi of ground distance traveled and an altitude ordinate hj, respectively, and parameterized by a first integer abscissa index i and a second integer index j, respectively. The coloured neighbourhoods respectively include the points P(xi, hj) and are coloured by colours K(xi, hj) that are dependent on the value of a local flight cost function CF(xi, hj) and a predetermined bijective lookup transformation or table.

BRIEF DESCRIPTION OF THE DRAWINGS

The invention will be better understood on reading the description of several embodiments which will follow, given solely by way of example and while referring to the drawings in which.

DETAILED DESCRIPTION

A method for assisting in the flight management of an aircraft according to the invention comprises the following main steps consisting in:

calculating and updating, using a computer having access to the data of a flight management system or using the flight management system and to meteorological forecast updates, an optimal trajectory in the predicted environment, in particular in the meteorological environment; then calculating, along a reference flight plan trajectory forecast or planned by the flight management system FMS, at given curvilinear distance intervals and at various altitudes, an instantaneous operating cost of the flight; then subsequently applying a colour scale, associating a colour with an operating cost, to zones, neighbourhoods or cells, each respectively including an operating cost calculating point, the calculating points forming the nodes of a two-dimensional grid in which the trajectory in the predicted environment varies, and all of the coloured zones, neighbourhoods or cells forming a coloured map; and displaying this coloured map on a screen of vertical display VD type;

displaying the optimal trajectory in the predicted environment as a superimposition in such a way as to allow it to be differentiated from the reference trajectory planned by the FMS.

Thus, the method for assisting in the flight management of an aircraft in terms of optimizing a flight operating cost such as for example the fuel consumption is based on:

calculating the instantaneous operating cost, for example the instantaneous fuel consumption, along the flight plan;

displaying, in the form of a colour code, those zones having an unfavourable cost, for example higher consumption, or conversely those zones having a favourable cost, for example lower consumption.

This flight management assist method can be carried out both inside a flight management system FMS and in the framework of an onboard open architecture or an architecture distributed on board and/or on the ground.

It should be noted that the onboard flight management computers that are currently used are capable of:

predicting the position, the speed and the mass of an aircraft at a time t, i.e. calculating the trajectory of the aircraft;

determining an optimal cruising speed on the basis of a cost index CI entered by the crew;

estimating the instantaneous fuel consumption and the direct operating costs of a flight.

Figure 1:
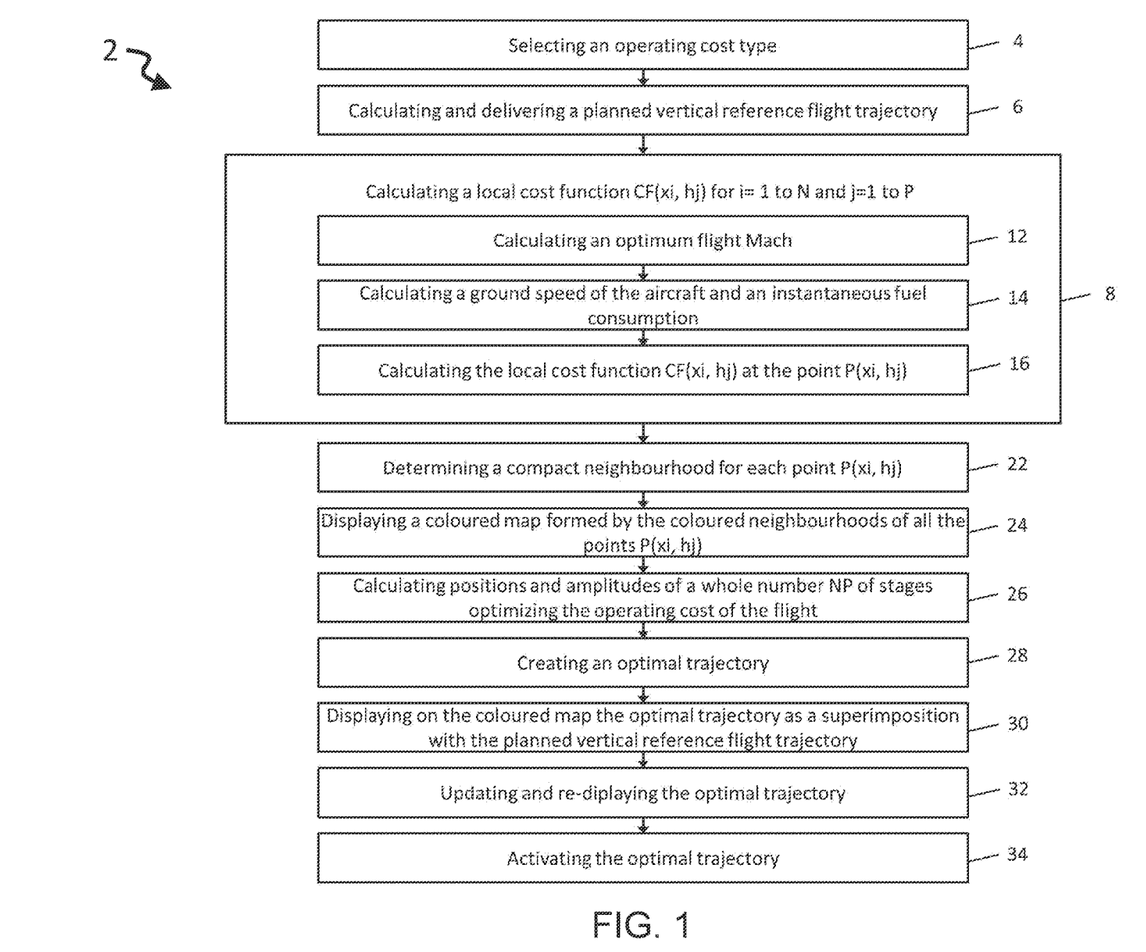
FIG. 1 is a flow chart of a method for assisting in the flight management of an aircraft according to the invention.

According to FIG. 1, a method 2 according to the invention for assisting in the flight management of an aircraft in terms of optimizing the operating costs of said aircraft comprises a set of steps.

In a prior step 4 of selecting an operating cost type or an "item of information of interest" from a set of operating cost types or items of information of interest, the option to select a preference to display an item of information of interest from direct operating costs and an instantaneous fuel consumption is offered to the crew using one or more selection commands.

Then, in a first step 6, a planned vertical reference flight trajectory is calculated and delivered on the basis of a flight plan, which is entered and validated by the crew.

Next, in a second step 8, a local cost function CF(xi, hj), representing a predetermined flight operating cost, is calculated at various altitudes hj along the planned reference flight trajectory over a discrete set of points P(xi, hj), defined by an abscissa xi and an ordinate hj, respectively, and parameterized by a first integer abscissa index i and a second integer index j, respectively, so as to form the nodes of a two-dimensional grid of a frame of reference in which the planned vertical reference flight trajectory varies, the calculation being performed locally at each point $P(x_i, h_j)$ according to aircraft data and environmental data predicted at said local point $P(x_i, h_j)$.

The first index i varies from 1 to N and the second index j varies from 1 to P, N and P denoting two integers that are larger than or equal to 2 and 3, respectively.

For each point $P(x_i, h_j)$, i varying from 1 to N and j varying from 1 to P, the second step 8 includes first, second and third sub-steps 12, 14 and 16, which are carried out successively.

In the first sub-step 12, an optimum flight Mach Mopt is calculated on the basis of the predicted flight trajectory in terms of position, speed and mass of the aircraft, predicted temperature and wind information and a database of aircraft performance.

Then, in the second sub-step 14, on the basis of the optimum Mach Mopt calculated in the first sub-step 12 and the predicted wind at $P(x_i, h_j)$; a ground speed $GS(x_i,h_j)$ of the aircraft and an instantaneous fuel consumption $FF(x_i,h_i)$ (fuel flow) are calculated.

Next, in the third sub-step 16, the local operating cost function $CF(x_i, h_j)$ at $P(x_i, h_j)$ is calculated as a local operating cost which is dependent on the ground speed $GS(x_i, h_j)$ of the aircraft and on the instantaneous fuel consumption $FF(x_i,h_j)$ at the point $P(x_i, h_j)$ of the grid.

At each point $P(x_i, h_j)$, the operating cost $CF(x_i, h_j)$ may be calculated according to:
a first expression $CF(x_i, h_j)=(FF(x_i, h_j)+CI*60)/GS(x_i, h_j)$, in which CI denotes a cost index; or
a second expression $CF(x_i, h_j)=FF(x_i, h_j)/GS(x_i, h_j)$.

The first expression relates to the direct operating costs while the second expression relates to an instantaneous fuel consumption.

It should be noted that the step of calculating the operating costs at the nodes $P(x_i, h_j)$ of the grid is implemented by using, as input data, the data arising from a calculation for predicting the trajectory and not the current state of the aircraft.

Then, in a third step 22 consecutive to the second step 8, for each point $P(x_i, h_j)$, a compact neighbourhood or cell of predetermined shape including said point $P(x_i, h_j)$ is determined and, with said point $P(x_i, h_j)$, a colour $K(x_i, h_j)$ is associated that is dependent on the value of the local cost function $CF(x_i, h_j)$ using a predetermined bijective lookup transformation T or table according to the following equation $K(x_i\ h_j)=T(CF(x_i,h_j))$.

The transformation T has one or other of the following features:
the colour representing a "neutral" cost, i.e. one which does not necessitate a modification of trajectory, corresponds to the currently calculated cost on the planned trajectory;
the colour representing a "neutral" cost, i.e. one which does not necessitate a modification of trajectory, corresponds to the mean cost $(C_{max}+C_{min})/2$ over the range of variation in the cost defined by a first, minimum cost value $C_{min}$ and a second, maximum cost value $C_{max}$.

Next, in a fourth step 24 consecutive to the third step 22, a vertical trajectory display VD displays a coloured map $K(x_i, h_j)$ formed by the coloured neighbourhoods or coloured cells of all of the points $P(x_i, h_j)$ of the two-dimensional grid.

Then, in a fifth step 26, positions and amplitudes of a whole number NP of stages which optimize the operating cost of the flight are calculated.

Next, in a sixth step 28 consecutive to the fifth step 26, an optimal trajectory in the predicted environment is created by using the calculated positions and amplitudes of the NP stages.

The fifth and sixth steps 26 and 28 may be implemented by using the method for developing a vertical trajectory profile comprising multiple altitude levels, described in U.S. Pat. No. 9,290,262 B2.

In a seventh step 30 consecutive to the sixth step 28, the optimal trajectory in the predicted environment is displayed as a superimposition on the coloured map so as to clearly distinguish it from the planned reference trajectory.

Then, in an eight step 32 consecutive to the seventh step 30 of updating and re-displaying, the optimal trajectory in the predicted environment is updated and re-displayed when trajectory update conditions are met.

The optimal trajectory update conditions in the predicted environment may for example be, without being exhaustive:
an update of the weather conditions; and/or
a change in a cost index; and/or
a modification of the lateral or vertical flight plan in the form of a modification of the route or an insertion of an altitude, speed or time restriction, or a modification of the cruising altitude, of accounting for a locally measured wind that differs significantly from the predicted wind.

Next, in an optional ninth step 34, the crew has the option to activate the optimal trajectory in the predicted environment in the flight management system FMS.

The pilot may thus use the optimal trajectory in the predicted environment as an "objective to be met" when negotiating with the air traffic control authorities.

In the case in which the pilot wishes to take the initiative in changing flight level, he or she may request clearances allowing him or her to follow the optimal trajectory.

In the case in which this request is refused, the pilot may use the coloured map according to the invention to view the impact of the clearance given by the air traffic control authorities.

In the case in which the air traffic control authorities request that the pilot change level, they may similarly use the coloured map according to the invention to view the impact of the modification and potentially transmit a counter-proposal.

The invention thus improves the process and the relevance of the decision-making relating to changing flight level by allowing the pilot to view:
the trajectory of the flight management system FMS currently followed by the aircraft;
the instantaneous operating costs of the flight at each point in the airspace;
the optimal trajectory in the environment that he or she should attempt to follow.

Figure 2:
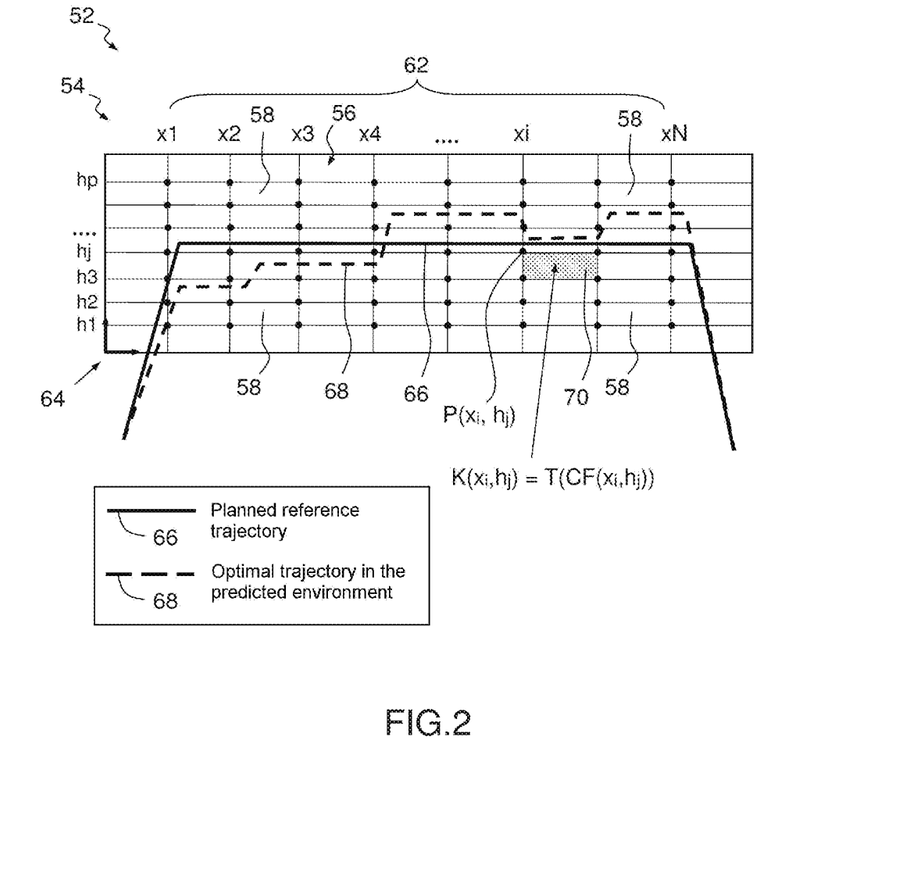
FIG. 2 is a view of a display for assisting in the flight management of an aircraft according to the invention allowing the implementation of the method of FIG. 1.

According to FIG. 2, a display 52 for assisting in the flight management of an aircraft according to the invention comprises a display screen 54 configured to display a coloured map $K(x_i, h_j)$ 56 formed by coloured neighbourhoods 58 of a discrete set of points $P(x_i, h_j)$ of a two-dimensional grid 62 of a frame of reference 64 in which a planned vertical reference flight trajectory 66 varies.

The points $P(x_i, h_j)$ are defined by an abscissa $x_i$ of ground distance traveled and an altitude ordinate $h_j$, respectively, and parameterized by a first integer abscissa index i and a second integer index j, respectively, i varying from 1 to N and j varying from 1 to P, N and P being two predetermined integers that are larger than 2 and 3, respectively.

The coloured neighbourhoods 58 respectively include the points P(xi, hj) and are coloured by colours K(xi, hj) that are dependent on the value of an instantaneous operating cost function CF(xi, hj), such as for example one of those defined in FIG. 1, and a predetermined bijective lookup transformation or table.

According to the screen display illustrated in FIG. 2, the planned reference trajectory 66 constructed by the flight management system and an optimal trajectory 68 in the predicted environment, for example in the meteorological environment, constructed by a first computer of the FMS or by a second computer of an electronic entity outside the FMS, are displayed at the same time on the display screen 56.

The grid of instantaneous operating costs 62 is also displayed on the screen 54 with each neighbourhood 58, associated with a node P(xi, hj), coloured according to the value of the operating cost calculated at said node P(xi, hj). Here, in a particular manner, the neighbourhood or cell associated with a node P(xi, hj) is a rectangular box of which the point P(xi, hj) is the upper left corner of said box. Each box of the coloured grid has a colour according to the value of the operating cost calculated at its upper left corner. Here, for the sake of simplicity of the illustration in FIG. 2, only the colour of the box 70 associated with the node P(xi, hj) has been shown, here in grey.

The size of the boxes 58 is chosen so as to have a visual representation that does not interfere with the use of the display by the crew. Furthermore, the shape of the boxes may be other than that of a rectangle.

The optimal trajectory 68 in the predicted environment and the planned reference trajectory 66 are superimposed on the coloured grid 62 of the operating costs.

In general, a system for assisting in the flight management of an aircraft comprises:

one or more electronic processing computers;

data entry means to allow a crew to enter data into the one or more computers;

at least one display for displaying one or more vertical flight trajectories; and a meteorological database;

The one or more electronic processing computers and one of the at least one display are configured:

in a first step, to calculate and deliver a planned vertical reference flight trajectory on the basis of a flight plan entered and validated by the crew;

in a second step, to calculate a local cost function CF(xi, hj), representing a predetermined flight operating cost, at various altitudes hj along the planned reference flight trajectory over a discrete set of points P(xi, hj), defined by an abscissa xi and an ordinate hj, respectively, and parameterized by a first integer abscissa index i and a second integer index j, respectively, so as to form the nodes of a two-dimensional grid of a frame of reference in which the planned vertical reference flight trajectory varies, the calculation being performed locally at each point P(xi, hj) according to aircraft data and environmental data predicted at said local point P(xi, hj); and in a third step, for each point P(xi, hj), to determine a compact neighbourhood of predetermined shape including said point P(xi, hj) and associating, with said point P(xi, hj), a colour K(xi, hj) that is dependent on the value of the local cost function CF(xi, hj) using a predetermined bijective lookup transformation or table according to the equation K(xi, hj)=T (CF(xi, hj)).

One of the at least one vertical trajectory display is configured, in a fourth step consecutive to the third step, to display a coloured map K(xi, hj) formed by the coloured neighbourhoods or coloured cells of all of the points P(xi, hj) of the two-dimensional grid.

The colour representing a "neutral" cost, which does not necessitate a modification of the vertical trajectory, corresponds to the currently calculated cost on the planned reference trajectory, or the colour representing a "neutral" cost, which does not necessitate a modification of trajectory, corresponds to a mean cost (Cmax+Cmin)/2 over the range of variation in the cost defined by a first, minimum cost value Cmin and a second, maximum cost value Cmax.

The one or more electronic processing computers are configured, in the second step and for each point (xi, hj), to successively carry out:

a first sub-step in which an optimum flight Mach Mopt is calculated on the basis of the predicted trajectory in terms of position, speed and mass of the aircraft, predicted temperature and wind information and a database of aircraft performance;

a second sub-step in which, on the basis of the calculated optimum Mach Mopt and the predicted wind at P(xi, hj), a ground speed GS of the aircraft and an instantaneous fuel consumption FF are calculated; and a third sub-step in which the local operating cost function CF(xi, hj) at P(xi, hj) is calculated as an operating cost which is dependent on the ground speed GS(xi, hj) of the aircraft and on the instantaneous fuel consumption FF(xi,hj) at the point P(xi, hj) of the grid.

In particular, the flight management assist system according to the invention may be deployed via a computer of FMS type or in a system integrating and interconnecting a computer of FMS type with an electronic flight tablet of EFB type.

Figure 3:
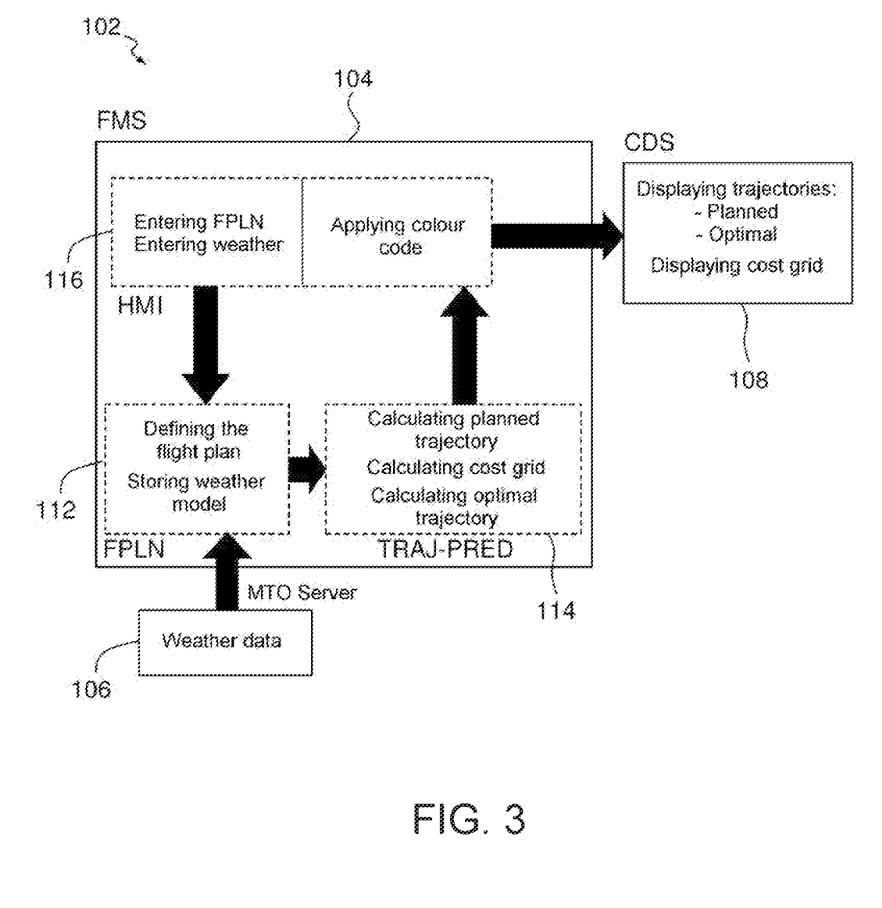
FIG. 3 is a view of a first embodiment of a system for assisting in the flight management of an aircraft according to the invention.

According to FIG. 3 and a first embodiment of a system for assisting in the flight management 102 of an aircraft, the planned reference trajectory, the grid of operating costs and the optimal trajectory in the predicted environment are calculated directly on an onboard electronic computer 104 of FMS type connected to a meteorological forecast server 106.

Here, a single processing computer having a high security level, this computer forming the flight management system FMS 104, is configured to calculate the planned reference trajectory, the cost grid, and an optimal trajectory in the predicted environment, and one and the same display CDS 108 (command and display system) is configured to display the planned reference trajectory, the cost grid, and the optimal trajectory in the predicted environment at the same time.

Here, the task of calculating the cost grid is assigned to a TRAJ-PRED component of the FMS which has the algorithmic means necessary for calculating the trajectory, since it is necessary to have performed the latter to be able to calculate the cost grid.

The flight management system FMS 104 comprises:

a flight plan determination module 112, referred to by the acronym FPLN (Flight PLaNning), for inputting geographical elements forming the skeleton of the route to be followed, such as the points dictated by the departure and arrival procedures, the waypoints, and the air corridors, commonly called the "airways", and for storing a meteorological model.

a trajectory prediction module 114, referred to by the acronym TRAJ-PRED, for constructing an optimized vertical profile on the lateral trajectory, and for providing distance, time, altitude, speed, fuel and wind estimates, in particular, at each point, on each change of flight parameters and on each change of destination, which will be displayed to the crew; this prediction module 114 is configured to calculate the planned reference trajectory, the grid of operating costs and the optimal trajectory in the predicted environment;

a human-machine interface (HMI) 116 for entering FPLN and meteorological data and for grouping this information together on one or more display screens in the form of display pages known to the person skilled in the art; this interface HMI is configured here to implement the colour coding of the cells of the grid of operating costs.

Figure 4:
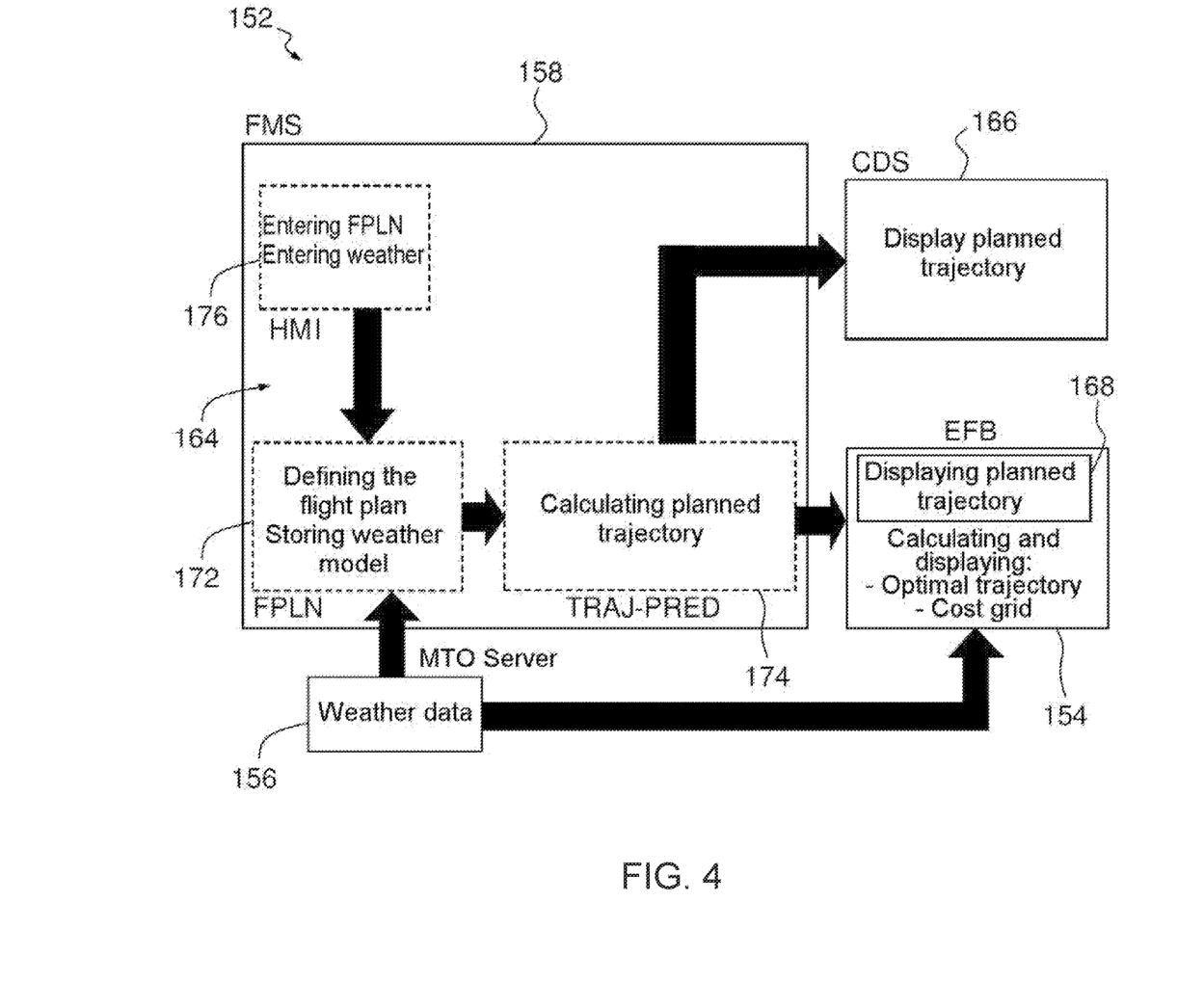
FIG. 4 is a view of a second embodiment of a system for assisting in the flight management of an aircraft according to the invention.

According to FIG. 4 and a second embodiment of a system for assisting in the flight management 152 of an aircraft, the planned reference trajectory, the grid of operating costs and the optimal trajectory in the predicted environment are calculated on a computer 154 of EFB (electronic flight bag) type, for example a touchscreen tablet or a PC, which is connected to a meteorological forecast server 156, and to a flight management system FMS 158, which provides it with the planned trajectory.

The group of electronic processing computers of the flight management assist system 152 includes a first processing computer 164 having a high security level, here the computer of the flight management system FMS, which is configured to calculate the planned reference trajectory, and a second processing computer, here the computer EFB 154, having a security level that is lower than that of the first processing computer 164, which is configured to calculate the cost grid and the optimal trajectory in the predicted environment.

Here, a first display CDS 166 is configured to display the planned reference trajectory and a second display 168, which is associated with the second computer EFB 154, is configured to display the grid of operating costs and the optimal trajectory in the predicted environment.

The flight management system FMS 158 comprises:

a flight plan determination module 172, referred to by the acronym FPLN (Flight PLaNning), for inputting geographical elements forming the skeleton of the route to be followed, and for storing a meteorological model;

a trajectory prediction module 174, referred to by the acronym TRAJ-PRED, for constructing an optimized vertical profile on the lateral trajectory, and for providing distance, time, altitude, speed, fuel and wind estimates, in particular, at each point, on each change of flight parameters and on each change of destination, which will be displayed to the crew; this prediction module 174 calculates here the planned reference trajectory, the grid of operating costs and the optimal trajectory in the predicted environment;

a human-machine interface (HMI) 176 for entering FPLN and meteorological data and for grouping this information together on one or more display screens in the form of display pages known to the person skilled in the art.

Figure 5:
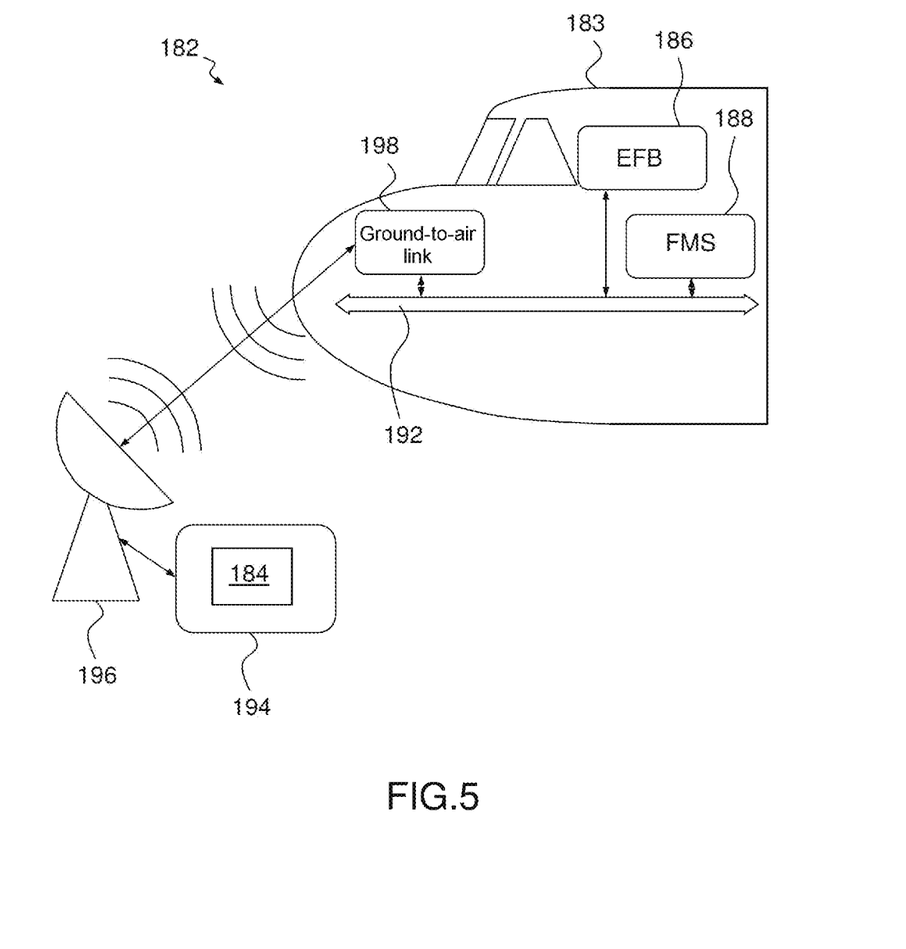
FIG. 5 is a view of a third embodiment of a system for assisting in the flight management of an aircraft according to the invention.

According to FIG. 5 and a third embodiment of a system for assisting in the flight management 182 of an aircraft 183, one example of the incorporation of the meteorological database 184 and an electronic flight tablet EFB 186 in said flight management assist system 182 is illustrated.

In the flight management assist system 182, the electronic flight tablet EFB 186 is configured, in the manner of the electronic flight bag EFB of FIG. 4, to calculate and to display, on one and the same screen, the optimal trajectory in the predicted environment and the coloured grid of the operating costs, and to display, on the same screen, the planned reference trajectory.

The electronic flight tablet EFB 186 is connected to a flight management system FMS 188 via an avionics bus 192.

Here, the meteorological database 184 is incorporated in a meteorological data server MTO 194, the server being connected to a ground station 196 for transmitting the meteorological data to the electronic flight bag 186 via a ground-to-air link interface 198 and the avionics bus 192.

As a variant, the meteorological database is on board the aircraft or physically embedded in a ground station that is remote from the aircraft and connected to the processing computer(s) via a telecommunications link.

As a variant, the meteorological data could be entered by the crew, as illustrated in FIG. 3.

In general, the one or more electronic processing computers are comprised in the set of computers of an onboard avionics system and an open "non-avionics" management system, and/or the one or more electronic processing computers are comprised in the set of computers of a flight management system FMS, of the onboard EFBs and of the computers of a ground tool of an operator, which computers are interfaced with the flight management system FMS. Thus the method for assisting in the flight management of an aircraft may be implemented in an onboard flight management avionics system, in an onboard tablet of EFB type, in a ground tool of the operator which is interfaced with the onboard flight management system, or by distribution over the three types of systems.

The invention claimed is:

1. A method for assisting in a flight management of an aircraft, implemented by an onboard or ground-based flight management assist system, the method comprising:

in a first step, calculating and delivering a planned vertical reference flight trajectory on the basis of a flight plan entered beforehand and validated by a flight crew of the aircraft;

in a second step, calculating a local cost function $CF(x_i, h_j)$, representing a predetermined flight operational cost, at various altitudes $h_j$ along the planned vertical reference flight trajectory over a discrete set of points $P(x_i, h_j)$, defined by an abscissa $x_i$ and an ordinate $h_j$, respectively, and parametrized by a first integer abscissa index i and a second integer index j, respectively, so as to form the nodes of a two-dimensional grid of a frame of reference in which the planned vertical reference flight trajectory varies, the calculation being performed locally at each point $P(x_i, h_j)$ of the discrete set of points according to aircraft data and environmental data predicted at said each point $P(x_i, h_j)$; and in a third step, determining, for each point $P(x_i, h_j)$ of the discrete set of points, a compact neighbourhood of predetermined shape including said each point $P(x_i, h_j)$, and associating, with said each point $P(x_i, h_j)$, a colour $K(x_i, h_j)$ that is dependent on the value of the local cost function calculated for said each point $P(x_i, h_j)$ using a predetermined bijective lookup transformation T or table, in a fourth step, consecutive to the third step, consisting in displaying, by means of a vertical trajectory display, a coloured map formed by the compact neighbourhoods of all of the points $P(x_i, h_j)$ of the two-dimensional grid, wherein the method further comprises:

a fifth step of calculating positions and amplitudes of an integer number NP of stages, each stage being defined within a given coloured neighbourhood, which optimizes an operating cost of a flight of the aircraft, based on said flight plan; and a sixth step, consecutive to the fifth step, of creating an optimal trajectory in a predicted environment using the calculated positions and the calculated amplitudes of the NP stages; and a seventh step, consecutive to the sixth step, of displaying the planned vertical reference flight trajectory and the optimal trajectory in the predicted environment as a superimposition on the coloured map so as to clearly distinguish the optimal trajectory from the planned vertical reference flight trajectory.

2. The method for assisting in the flight management of the aircraft according to claim 1, wherein:

the colour representing a cost, which does not necessitate a modification of the planned vertical reference flight trajectory, corresponds to a currently calculated cost on the planned vertical reference flight trajectory, or corresponds to a mean cost (Cmax+Cmin)/2 over the range of variation in the operational cost defined by a first, minimum cost value Cmin and a second, maximum cost value Cmax.

3. The method for assisting in the flight management of the aircraft according to claim 1, wherein:

for each point P(xi, hj) of the discrete set of points, the second step successively carries out a first sub-step in which an optimum flight Mach Mopt is calculated on the basis of the planned vertical reference flight trajectory in terms of position of the aircraft, speed of the aircraft mass of the aircraft, predicted temperature information and predicted wind information, and a database of aircraft performance;

a second sub-step in which, on the basis of the calculated optimum Mach Mopt and the predicted wind information at said each point P(xi, hj), a ground speed GS(xi, hj) of the aircraft and an instantaneous fuel consumption FF(xi, hj) are calculated; and a third sub-step in which the local cost function at said each point P(xi, hj) is an operating cost CF(xi, hj) which is dependent on the ground speed GS(xi, hj) of the aircraft and on the instantaneous fuel consumption FF(xi, hj) at said each point P(xi, hj) of the two-dimensional grid.

4. The method for assisting in the flight management of the aircraft according to claim 3, wherein:

at said each point P(xi, hj), the local operational cost CF(xi, hj) is calculated according to:

a first expression CF(xi, hj)=(FF(xi, hj)+CI *60)/GS(xi, hj), in which CI denotes a cost index; or a second expression CF(xi, hj)=FF(xi, hj)/GS(xi, hj).

5. The method for assisting in the flight management of the aircraft according to claim 4, wherein the expression for calculating the local operational cost CF(xi, hj) can be selected from either of the first expression and the second expression.

6. The method for assisting in the flight management of the aircraft according to claim 1, further comprising:

an eighth step, consecutive to the seventh step, of updating and re-displaying the optimal trajectory in the predicted environment when trajectory update conditions are met.

7. The method for assisting in the flight management of the aircraft according to claim 6, in which the trajectory update conditions include at least one of the following conditions:

an update of the weather conditions;
a change in a cost index;
a modification of a lateral profile or a vertical profile of said flight plan in the form of a modification of the route or an insertion of an altitude restriction, an insertion of a speed restriction or an insertion of a time restriction, or a modification of a cruising altitude associated with the flight plan; or a consideration of a locally measured wind that differs from the predicted wind information.

8. A system for assisting in a flight management of an aircraft, comprising one or more electronic processing computers, the one or more electronic processing computers being configured to receive data from a flight crew of the aircraft, wherein the system further comprises:

at least one display for displaying one or more vertical flight trajectories; and a meteorological database;

the one or more electronic processing computers and one of the at least one display being configured, in a first step, to deliver a planned vertical reference flight trajectory on the basis of a flight plan entered beforehand and validated by the flight crew;

wherein the one or more electronic processing computers are configured to:

calculate a local cost function CF(xi, hj), representing a predetermined flight operational cost, at various altitudes hj along the planned vertical reference flight trajectory over a discrete set of points P(xi, hj), defined by an abscissa xi and an ordinate hj, respectively, and parametrized by a first integer abscissa index i and a second integer index j, respectively, so as to form a two-dimensional grid in which the planned vertical reference flight trajectory varies, the local cost function CF(xi, hj) being calculated locally at each point P(xi, hj) of the discrete set of points according to aircraft data and environmental data predicted at said each point P(xi, hj); and determine, for each point P(xi, hj) of the discrete set of points, a compact neighbourhood of predetermined shape including said each point P(xi, hj), and associating, with said each point P(xi, hj), a colour K(xi, hj) that is dependent on the value of the local cost function calculated for said each point P(xi, hj) using a predetermined bijective lookup transformation T or table, display, by means of a vertical trajectory display, a coloured map formed by the compact neighbourhoods of all of the points P(xi, hj) of the two-dimensional grid, wherein the system is further configured to:

calculate positions and amplitudes of an integer number NP of stages, each stage being defined within a given coloured neighbourhood, which optimizes an operating cost of a flight of the aircraft, based on said flight plan;

create an optimal trajectory in a predicted environment using the calculated positions and the calculated amplitudes of the NP stages; and display the planned vertical reference flight trajectory and the optimal trajectory in the predicted environment as a superimposition on the coloured map so as to clearly distinguish the optimal trajectory from the planned vertical reference flight trajectory.

9. The system for assisting in the flight management of the aircraft according to claim 8, wherein:

at least one vertical trajectory display is configured to display a coloured map K(xi, hj) formed by the compact neighbourhoods and associated colours determined for the discrete set of points P(xi, hj).

10. The system for assisting in the flight management of the aircraft according to claim 8, wherein:

the colour representing a cost, which does not necessitate a modification of the planned vertical reference flight trajectory, corresponds to a currently calculated cost on the planned vertical reference flight trajectory, or corresponds to a mean cost (Cmax+Cmin)/2 over the range of variation in the cost defined by a first, minimum cost value Cmin and a second, maximum cost value Cmax.

11. The system for assisting in the flight management of the aircraft according to claim 8, wherein:
the one or more electronic processing computers are configured, in the step of calculating the local cost function CF(xi, hj), and for each point P(xi, hj) of the discrete set of points, to successively carry out;
a first sub-step in which an optimum flight Mach Mopt is calculated on the basis of the planned vertical reference flight trajectory in terms of position of the aircraft, speed of the aircraft, mass of the aircraft, predicted temperature information, predicted wind information, and a database of aircraft performance;
a second sub-step in which, on the basis of the calculated optimum Mach Mopt and the predicted wind information at said each point P(xi, hj), a ground speed GS(xi, hj) of the aircraft and an instantaneous fuel consumption FF(xi, hj) are calculated; and
a third sub-step in which the local cost function at said each point P(xi, hj) is a local operational cost which is dependent on the ground speed GS(xi, hj) of the aircraft and on the instantaneous fuel consumption FF(xi, hj) at said each point P(xi, hj) of the two-dimensional grid.

12. The system for assisting in the flight management of the aircraft according to claim 8, wherein:
the meteorological database is on board the aircraft, or located on the ground while being physically embedded in or connected to a ground station that is remote from the aircraft, the ground station being connected to the one or more electronic processing computers via a telecommunications link.

13. A system for assisting in a flight management of an aircraft, comprising one or more electronic processing computers, the one or more electronic processing computers being configured to receive data from a flight crew of the aircraft, wherein the system further comprises:
at least one display for displaying one or more vertical flight trajectories; and
a meteorological database;
the one or more electronic processing computers and one of the at least one display being configured, in a first step, to deliver a planned vertical reference flight trajectory on the basis of a flight plan entered beforehand and validated by the flight crew;
wherein the one or more electronic processing computers are configured to:
calculate a local cost function CF(xi, hj), representing a predetermined flight operational cost, at various altitudes hj along the planned vertical reference flight trajectory over a discrete set of points P(xi, hj), defined by an abscissa xi and an ordinate hj, respectively, and parametrized by a first integer abscissa index i and a second integer index j, respectively, so as to form a two-dimensional grid in which the planned vertical reference flight trajectory varies, the local cost function CF(xi, hj) being calculated locally at each point P(xi, hj) of the discrete set of points according to aircraft data and environmental data predicted at said each point P(xi, hj); and
determine, for each point P(xi, hj) of the discrete set of points, a compact neighbourhood of predetermined shape including said each point P(xi, hj), and associating, with said each point P(xi, hj), a colour K(xi, hj) that is dependent on the value of the local cost function calculated for said each point P(xi, hj) using a predetermined bijective lookup transformation T or table,
wherein:
the one or more electronic processing computers is a single processing computer having a security level configured to calculate the planned vertical reference flight trajectory, a cost grid, and an optimal trajectory in a predicted environment; a single display is configured to display, at the same time, the planned vertical reference flight trajectory, the cost grid, and the optimal trajectory in the predicted environment, said cost grid comprising a box associated with each point P(xi, hj) of the discrete set of points, each box of the cost grid having a colour which depends on the calculated local cost function for each respective point P(xi, hj); or
the one or more electronic processing computer includes a first processing computer having a security level, configured to calculate the planned reference trajectory, and a second processing computer having a security level that is lower than the security level of the first processing computer, configured to calculate the cost grid, and an optimal trajectory in the predicted environment; a first display is configured to display the planned reference trajectory and a second display is configured to display the cost grid, the planned reference trajectory and the optimal trajectory in the predicted environment.

* * * * *